United States Patent

Imai

[19]

[11] Patent Number: 6,008,614
[45] Date of Patent: Dec. 28, 1999

[54] SYNCHRONOUS MOTOR WITH PERMANENT MAGNETS AND MOTOR SYSTEM

[75] Inventor: Nobuyuki Imai, Saitama, Japan

[73] Assignee: Honda Giken Kogyo Kabushiki Kaisha, Tokyo, Japan

[21] Appl. No.: 08/715,483

[22] Filed: Sep. 18, 1996

Related U.S. Application Data

[63] Continuation of application No. 08/596,695, Feb. 5, 1996, abandoned, which is a continuation of application No. 08/184,411, Jan. 18, 1994, abandoned, which is a continuation of application No. 07/846,845, Mar. 6, 1992, abandoned.

[30] Foreign Application Priority Data

Mar. 8, 1991 [JP] Japan ..................... 3-69212

[51] Int. Cl.$^6$ ..................................... H02P 5/28
[52] U.S. Cl. ......................... 318/700; 318/798; 318/805; 318/806
[58] Field of Search .................... 318/700–813, 318/138, 139, 245, 254, 439

[56] References Cited

U.S. PATENT DOCUMENTS

| | | | |
|---|---|---|---|
| 3,740,629 | 6/1973 | Kohlhagen | 318/138 |
| 4,450,395 | 5/1984 | Kawamura et al. | 318/721 |
| 4,651,840 | 3/1987 | Shimizu et al. | 180/446 |
| 4,724,373 | 2/1988 | Lipo | 318/805 |
| 4,857,786 | 8/1989 | Nihei et al. | 310/156 |
| 5,038,065 | 8/1991 | Matsubayashi et al. | 310/162 |
| 5,038,092 | 8/1991 | Asano | 318/809 |
| 5,144,564 | 9/1992 | Naidu et al. | 318/721 |

OTHER PUBLICATIONS

Mulukutla S. Sarma, "Electric Machines–Steady State Theory and Dynamic Performance", West Publishing Co, 1985, pp. 487–522.

Akira Kumamoto and Yoshihisa Hirane, A Semi–Closed loop Torque Control of a Buried Permanent Magnet Motor Based on a New Flux Weakening Approach, IEEE IAS Annual Meeting Part I, Oct. 1989, San Diego, pp. 656–661.

Stephen R. Macminn and Thomas M. Jahns, Control Techniques for Improved High–Speed Performance of Interior PM Synchronous Motor Drives, IEEE Transactions on Industry Applications, vol. 27, No. 5, Sep. 1991, New York, pp. 997–1004.

Primary Examiner—Paul Ip
Attorney, Agent, or Firm—Lyon & Lyon LLP

[57] ABSTRACT

In a motor with permanent magnets and a motor system, the value $\alpha$ produced by dividing, by the induced voltage constant ke, the product of the inductance Lm of the motor itself or the inductance Ls of the motor system in the d-q coordinate system is selected to meet a predetermined condition. The range of rotational speeds in which the motor can be operated while maintaining a predetermined output under field weakening control can be widened. If a condition is established to determine a ratio by which the rated rotational speed under normal operating conditions is multiplied into a rotational speed under field weakening control, then conditions for a motor or a motor system that can be used can be determined.

19 Claims, 7 Drawing Sheets

SYNCHRONOUS MOTOR WITH PERMANENT MAGNETS AND MOTOR SYSTEM

This is a continuation of application Ser. No. 08/596,695, filed Feb. 5, 1996, now abandoned, which is a continuation of application Ser. No. 08/184,411, filed on Jan. 18, 1994, now abandoned, and which in turn is a continuation of application Ser. No. 07/846,845 filed Mar. 6, 1992, now abandoned.

BACKGROUND OF THE INVENTION

1. Field of the Invention

The present invention relates to a synchronous motor with permanent magnets which is suitable for operation under equivalent field weakening control, and a motor system including such a synchronous motor.

2. Description of the Relevant Art

*BASICS AND APPLICATIONS OF BRUSHLESS SERVOMOTORS*, published by General Electronic Publishing Company, describes the technology given below, in Chapter 6, Section 2, *Control of Brushless Servomotor*, and Chapter 6, Section 4, *Equivalent Field Weakening Control.*

Alternating currents flows through a brushless servomotor, and the relative speed of axes (d-, q-axes) rotating in synchronism with the alternating currents is zero, simplifying an equation model.

According to a model based on the d/q-axis conversion proposed by Coulomb, the voltage and current of a brushless motor are related to each other as described by the equations (1) below.

$$\begin{bmatrix} Vd \\ Vq \end{bmatrix} = \begin{bmatrix} Ra + pLa & -\omega mLa \\ \omega mLa & Ra + pLa \end{bmatrix} \begin{bmatrix} id \\ iq \end{bmatrix} + \begin{bmatrix} \omega m\phi \\ 0 \end{bmatrix}$$

$$Te = \tfrac{3}{4} \times (\text{number of poles}) \times \phi id = J\omega m + B\omega m + Tl$$

where

Ra: Armature resistance,

La: Armature inductance,

J: Motor inertia, $\phi$: Magnetic flux (constant) of permanent magnets, $\omega m$: Motor angular velocity, B: Coefficient of viscous friction, p: d/dt, Vd: d-axis voltage, Vq: q-axis voltage, id: d-axis current, iq: q-axis current, Te: Output torque, and Tl: Load torque.

Generally, the q-axis current iq is controlled so that it is zero. Therefore, the d-axis current id becomes the motor current. Since the values pLa id and pLa iq are zero under the normal condition, the voltages Vds, Vdq at the terminals of the motor are expressed by the following equations (2):

$$Vds = Ra\ id - \omega mLa\ iq + \omega m\phi,$$

$$Vdq = Ra\ iq + \omega mLa\ id \qquad (2).$$

The field of a brushless servomotor with permanent magnets cannot be controlled because the field current cannot be varied. The voltage of the armature increases in proportion to the speed of the rotor. When the armature voltage exceeds the maximum voltage of a voltage source PWM inverter, the motor cannot operate at a speed higher than the speed corresponding to that voltage.

The equivalent field weakening control process which reduces the field intensity based on the armature reaction makes it possible to rotate the motor at higher speed.

According to the torque equation (1) and the equations (2), if the q-axis current iq is iq=0, then the motor terminal voltage increases in proportion to the motor angular velocity $\omega m$ and the d-axis current id, i.e., the instantaneous torque. Therefore, the equivalent field weakening control process is carried out by controlling the q-axis current iq.

FIG. 1 of the accompanying drawings shows voltage vectors under the normal condition.

In FIG. 1, V0 represents the motor terminal voltage when the q-axis current iq is iq=0.

When the q-axis current iq is fully controlled, the motor terminal voltage V can be equalized to the maximum output voltage Vmax of the voltage source PWM inverter, as shown in FIG. 1.

The motor current should be lower than an allowable maximum current Imax. Therefore, the maximum output torque should be limited in its magnitude when the motor operates at high speed.

FIG. 2 of the accompanying drawings shows current vectors indicating the path a motor current i follows when the output torque of the motor is maximum. FIG. 3 of the accompanying drawings shows the relationship between the torque, the output, the voltage, and the motor speed that are required for the motor to operate under the field weakening control.

If the motor angular velocity $\omega m$ exceeds a value $\omega m1$ (FIG. 3), then the motor terminal voltage V is held to Vmax by controlling the q-axis current iq. The maximum output torque is reduced by reducing the d-axis current id.

If the motor angular velocity $\omega m$ exceeds a value $\omega m2$, then the q-axis current iq is held to Iqmax.

If the motor angular velocity $\omega m$ exceeds a value $\omega m3$, then the d-axis current id, i.e., the output torque Te, becomes zero. The motor angular velocity $\omega m3$ at this time is the allowable maximum rotational speed of the synchronous motor with permanent magnets.

Various motors have been operated according to the equivalent field weakening control process. As a result, it has been found that the motors have widely different ranges of rotational speeds that can exceed the output (hereinafter referred to as "rated output") at the maximum rotational speed (hereinafter referred to as "rated motor speed") under normal operating conditions, the ranges of rotational speeds being representative of a ratio k by which the rated motor speed can be multiplied into the rotational speed.

SUMMARY OF THE INVENTION

It is an object of the present invention to provide a synchronous motor with permanent magnets which is suitable for operation according to an equivalent field weakening control process, and a motor system including such a synchronous motor.

According to the present invention, there is provided a synchronous motor with permanent magnets having an inductance La, a rated current Ip, and an induced voltage constant Ke in a d/q-axis conversion system of the synchronous motor, characterized in that a value $\alpha$ produced by dividing the product of the inductance La and the rated current Ip by the induced voltage constant Ke according to an equation (3) falls in a range represented by an inequality (4):

$$La \cdot Ip/Ke = \alpha \qquad (3)$$

$$\sqrt{\frac{(k-1)^2}{k^2-1}} \le \alpha \le \sqrt{\frac{(k+1)^2}{k^2-1}} \qquad (4)$$

where k is a ratio by which a rated rotational speed can be multiplied to a rotational speed for operation without reducing the output below the rated output.

The value α represented by the equation (3) is 1.

According to the present invention, there is also provided a motor system comprising a synchronous motor with permanent magnets and a driver circuit for driving the synchronous motor, the motor system having an inductance Ls, a rated current Ip, and an induced voltage constant Ke in a d/q-axis conversion system of the motor system, characterized in that a value α produced by dividing the product of the inductance Ls and the rated current Ip by the induced voltage constant Ke according to an equation (5) falls in a range represented by an inequality (6):

$$Ls \cdot Ip/Ke = \alpha \qquad (5)$$

$$\sqrt{\frac{(k-1)^2}{k^2-1}} \le \alpha \le \sqrt{\frac{(k+1)^2}{k^2-1}} \qquad (6)$$

where k is a ratio by which a rated rotational speed can be multiplied to a rotational speed for operation without reducing the output below the rated output.

The value α represented by the equation (5) is 1.

The motor system further includes correcting inductances connected in series or parallel to windings of the synchronous motor for making the inductance Ls satisfy the equation (5).

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

In the description below, values as converted onto d- and q-axes will be dealt with.

It is assumed that a maximum current which can be continuously supplied to a motor is referred to as a rated current Ip, and a rotational speed at which the motor can continuously produce a maximum output under ordinary orthogonal field control.

Figure 1:
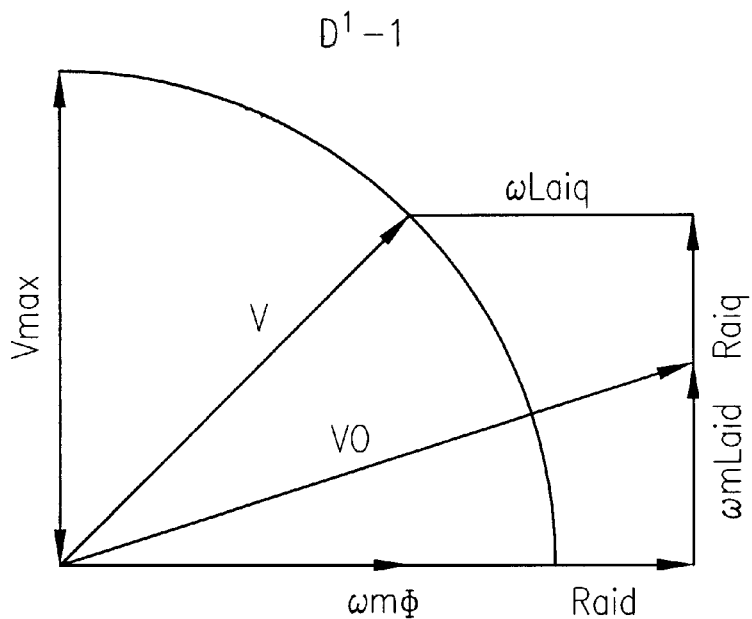
FIG. 1 is a diagram of voltage vectors under the normal condition, the diagram being illustrative of the prior art.
Figure 2:
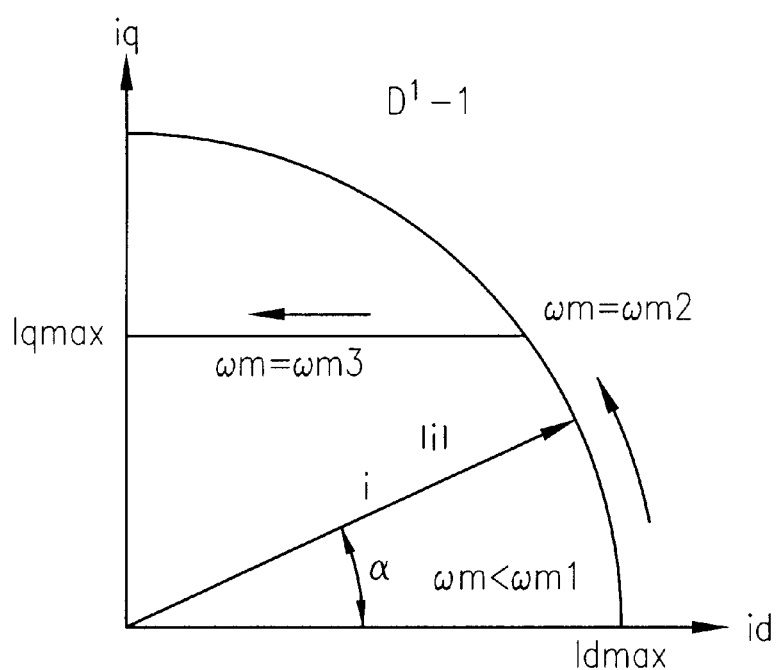
FIG. 2 is a diagram of current vectors indicating the path which a motor current follows when the output torque of the motor is maximum, the diagram being illustrative of the prior art.
Figure 3:
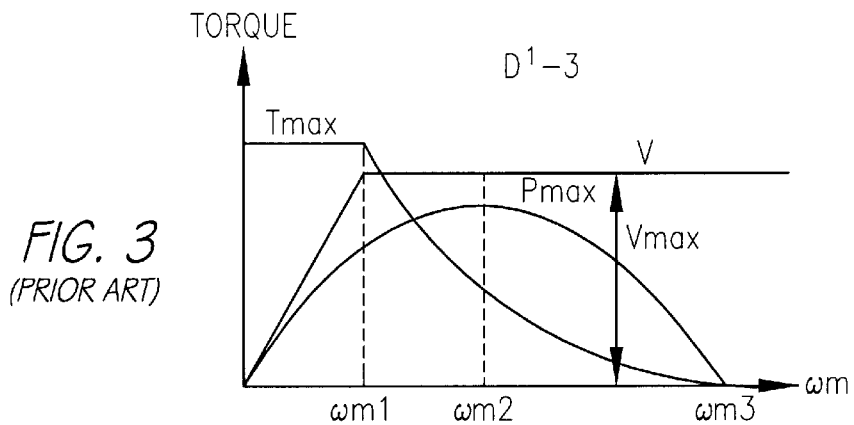
FIG. 3 is a diagram showing the relationship between the torque, the output, the voltage, and the motor speed that are required for the motor to operate under field weakening control, the diagram being illustrative of the prior art.
Figure 4:
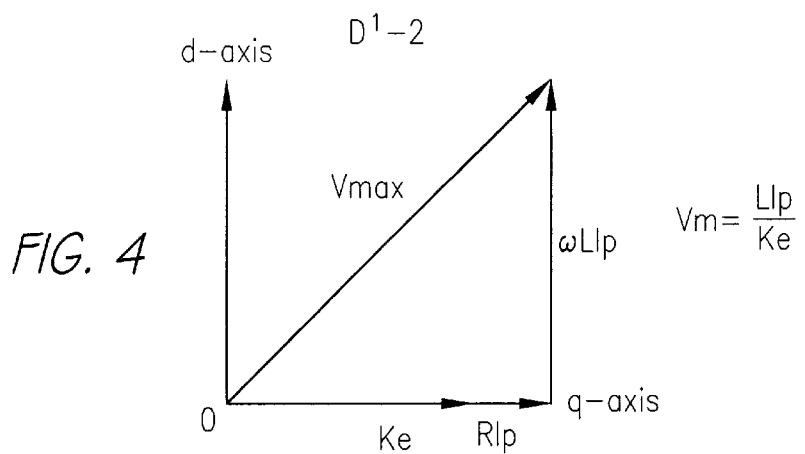
FIG. 4 is a diagram of voltage vectors when a synchronous motor rotates at a rated speed.

FIG. 4 shows voltage vectors when a synchronous motor rotates at a rated speed.

In FIG. 4, Ke represents an induced voltage constant, R a phase resistance, L a phase inductance, ω an electrical angular frequency, Ip a rated current, and Vmax a maximum output voltage from an inverter.

Figure 5:
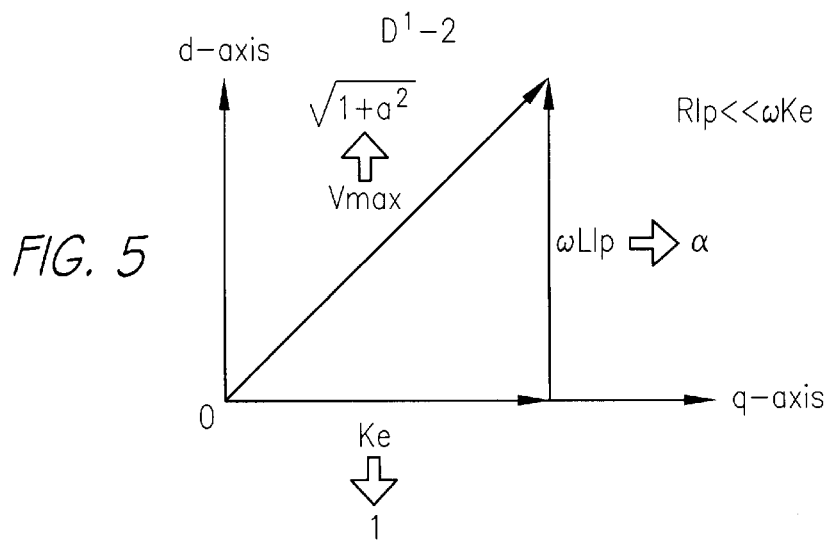
FIG. 5 is a diagram of voltage vectors which is a simplified version of the diagram of FIG. 4.

If it is assumed that an induced voltage vector ωke and a voltage vector ωLIp based on the phase inductance are sufficiently larger than a voltage vector RIp based on the phase resistance R, then the voltage vector diagram of FIG. 4 can be simplified into a voltage vector diagram shown in FIG. 5.

In FIG. 5, when the induced voltage vector ωke is normalized to 1, and LIp/Ke is represented by α, the inverter maximum output voltage Vmax can be expressed by the following equation (7):

$$|Vmax| = \sqrt{1+\alpha^2} . \qquad (7)$$

It is now assumed that the synchronous motor is operated at a speed that is k times higher than the rated speed.

Figure 6:
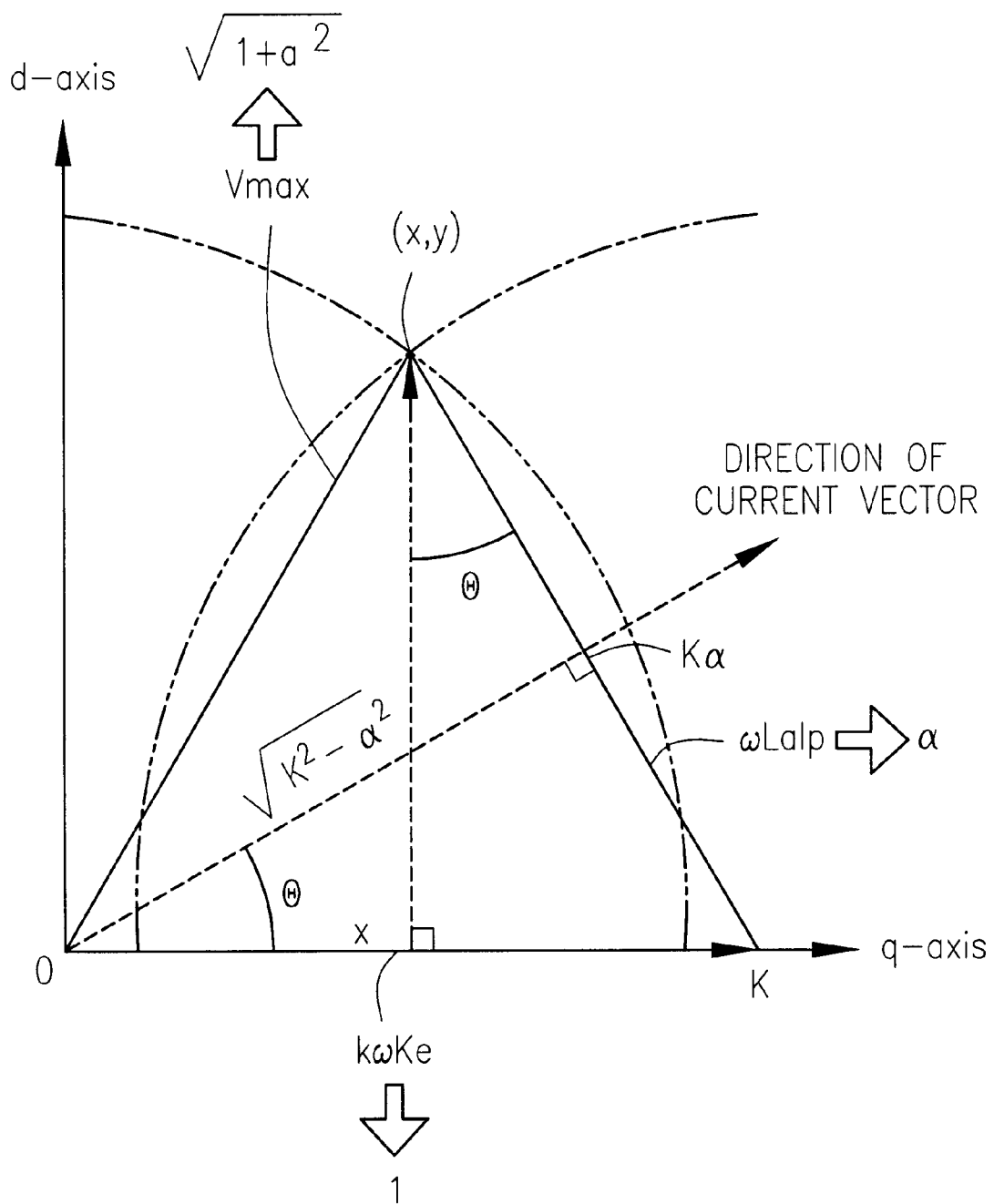
FIG. 6 is a diagram of voltage vectors when the synchronous motor rotates at a speed which is k times higher than the rated speed.

Because of the limited field, the maximum current is limited to the rated current Ip. The motor cannot be supplied with voltages higher than the inverter maximum output voltage vector Vmax. Therefore, voltage vectors produced when the motor is operated at a speed that is k times higher than the rated speed are as shown in FIG. 6.

As with FIG. 5, the induced voltage vector ωke is normalized to 1, and LIp/Ke is represented by α. The coordinates (x, y) of a point of intersection between the induced voltage vector kωLIp and the inverter maximum output voltage Vmax are given as the solutions of simultaneous equations (8) and (9) below.

$$(x-k)^2+y^2=k^2\alpha^2 \qquad (8)$$

$$x^2+y^2=1+\alpha^2 \qquad (9).$$

These equations (8) and (9) are solved for x and y. First, the equation (9) is subtracted from the equation (8), providing an equation (10). The equation (10) is squared into an equation (11), which is substituted in the equation (9), providing an equation (12).

$$-2kx+k^2=-1+(k^2-1)\alpha^2$$

$$x = \frac{k^2+1}{2k} - \frac{k^2-1}{2k}\alpha^2. \tag{10}$$

$$x^2 = \frac{(k^2+1)^2}{4k^2} - \frac{(k^2+1)(k^2-1)}{2k^2}\alpha^2 + \frac{(k^2-1)^2}{4k^2}\alpha^4 \tag{11}$$

$$y^2 = 1 + \alpha^2 - x^2$$

$$= \frac{4k^2 - (k^2+1)^2}{4k^2} + \frac{(2k^2+k^4-1)}{2k^2}\alpha^2 - \frac{(k^2-1)^2}{4k^2}\alpha^4$$

$$= -\frac{(k^2-1)^2}{4k^2} + \frac{(k^2+1)^2-2}{2k^2}\alpha^2 - \frac{(k^2-1)^2}{4k^2}\alpha^4. \tag{12}$$

$$\frac{(k^2-1)^2}{4k^2}\alpha^4$$

The direction of a current vector indicated by the dotted line in FIG. 6 is perpendicular to the voltage vector $k\omega LIp$ based on the inductance. Therefore, the angle (torque angle) $\theta$ formed between the current vector and the induced voltage vector $k\omega Ke$ is equal to the angle formed between the voltage vector $k\omega LIp$ based on the inductance and a line extending from the point (x, y) of intersection between the vector $k\omega LIp$ based on the inductance and the inverter maximum output voltage vector Vmax perpendicularly to the q-axis.

Accordingly, the power factor $\cos\theta$ is given by the equation (13).

$$\cos\theta = \frac{y}{\alpha^2}. \tag{13}$$

The greater the power factor, the more efficiently it is possible to operate the motor for generating a maximum output with a fixed current.

Independent variables k, $\alpha$ are determined such that they are of most efficient values.

The power factor is a monotonously increasing function in the range of $0 < \theta < \pi/2$. The independent variables k, $\alpha$ are determined which give an extreme value of $\cos\theta$ and an extreme value of the square of $\cos\theta$.

The following equation (14) is derived from the equations (12) and (13):

$$\cos^2\theta = y^2/\alpha^2$$

$$= \frac{-\frac{(k^2-1)^2}{4k^2} + \frac{(k^2+1)^2-2}{2k^2}\alpha^2 - \frac{(k^2-1)^2}{4k^2}\alpha^4}{\alpha^2} \tag{14}$$

$$= -\frac{(k^2-1)^2}{4k^2}\alpha^{-2} + \frac{(k^2+1)^2-2}{2k^2} - \frac{(k^2-1)^2}{4k^2}\alpha^2$$

The equation (14) is partially differentiated into the following equation (15):

$$\frac{\partial}{\partial\alpha}\cos^2\theta = +\frac{(k^2-1)^2}{2k^2}\alpha^{-3} - \frac{(k^2-1)^2}{2k^2}\alpha \tag{15}$$

$$= \frac{(k^2-1)^2}{2k^2} > 0.$$

$$+\frac{(k^2-1)^2}{2k^2}\alpha^{-3} - \frac{(k^2-1)^2}{2k^2}\alpha$$

Because of the relationship represented by the equations (16) below, it can be understood that the power factor is maximum when $\alpha=1$ irrespective of k.

$$\frac{(k^2-1)^2}{2k^2} > 0$$

$$\alpha > 0 \tag{16}$$

Under the field weakening control, the synchronous motor or a motor system incorporating the same can be operated most efficiently when the following equation (17) is satisfied:

$$\frac{LIp}{Ke} = 1. \tag{17}$$

The output P of the motor when it is operated at a speed that is k times higher than the rated speed is indicated by the following equation (18):

$$P = Ip \times \omega Ke \times \cos\theta$$

$$= Ip \times k \times \frac{y}{k\alpha}$$

$$= Ip \times \frac{y}{\alpha}$$

Therefore, the ratio $y/\alpha$ of the y coordinate of the point (x, y) of intersection between the voltage vector $k\omega LIp$ based on the inductance and the inverter maximum output voltage vector Vmax to $\alpha$ may be 1 or more.

Since complex equations would be required to determine the coordinate y, a range of $\alpha$ in which the square of $(y/\alpha)$ is 1 or more is determined according to the following inequality (19) of second degree with respect to the square of $\alpha$. The inequality (19) is modified into an inequality (20), from which an inequality (21) is derived.

$$\left(\frac{y}{\alpha}\right)^2 = -\frac{(k^2-1)^2}{4k^2}\left(\alpha^2 + \frac{1}{\alpha^2}\right) + \frac{(k^2+1)^2-2}{2k^2} \geq 1 \tag{19}$$

$$\frac{(k^2-1)^2}{4k^2}\left(\alpha^2 + \frac{1}{\alpha^2}\right) \leq \frac{(k^2+1)^2-2-2k^2}{2k^2}$$

$$\left(\alpha^2 + \frac{1}{\alpha^2}\right) \leq 2\frac{k^4-1}{(k^2-1)^2} = \frac{2(k^2+1)}{k^2-1}.$$

-continued $$\alpha^4 - \frac{2(k^2+1)}{k^2-1}\alpha^2 + 1 \leq 0 \quad (20)$$

$$\frac{k^2+1}{k^2-1} - \sqrt{\left(\frac{k^2+1}{k^2-1}\right)^2 - 1} \leq \alpha^2 \leq \frac{k^2+1}{k^2-1} + \sqrt{\left(\frac{k^2+1}{k^2-1}\right)^2 - 1}$$

$$\frac{(k-1)^2}{k^2-1} \leq \alpha^2 \leq \frac{(k+1)^2}{k^2-1}.$$

$$\sqrt{\frac{(k-1)^2}{k^2-1}} \leq \alpha \leq \sqrt{\frac{(k+1)^2}{k^2-1}}. \quad (21)$$

It can be seen that when k is larger than 1, an inequality (22), given below, is derived from the inequality (21), and the rated output cannot be maintained when the motor rotates at the speed k times higher than the rated speed unless α takes a value within a range including 1.

$$0 \leq \sqrt{\frac{(k-1)^2}{k^2-1}} \leq 1 \leq \sqrt{\frac{(k+1)^2}{k^2-1}} \quad (22)$$

As indicated by the following equations (23), it is necessary for the value α to be α=1 in order to maintain the rated output at a desired rotational speed in excess of the rated rotational speed:

$$\lim_{k \to \infty} \sqrt{\frac{(k-1)^2}{k^2-1}} = 1 \quad (23)$$

$$\lim_{k \to \infty} \sqrt{\frac{(k+1)^2}{k^2-1}} = 1.$$

In an actual motor and a motor system employing the same, however, the range of rotational speeds in which the rated output can be maintained even when α=1 is limited because of the core loss, the copper loss, and the machine loss.

When a ratio k by which the rated rotational speed can be multiplied into a speed at which the motor can rotate without reducing the output below the rated output is given, any motor or any motor system whose value α satisfies the condition represented by the equation (21) can be operated up to a speed which is k times higher than the rated rotational speed without reducing the output below the rated output.

If the value α is set to 1, then the range of rotational speeds in which the desired output can be obtained can be increased for efficient field weakening motor operation.

Table 1 below shows various specifications of synchronous motors with permanent magnets according to first through fourth embodiments. Operating characteristics of the synchronous motors according to the first through fourth embodiments under equivalent field weakening control are shown in FIGS. 7 through 10, respectively.

In the synchronous motors according to the first through fourth embodiments, the values α in Table 1 are obtained by varying the inductance La in the d-q coordinate system.

TABLE 1

Figure 7:
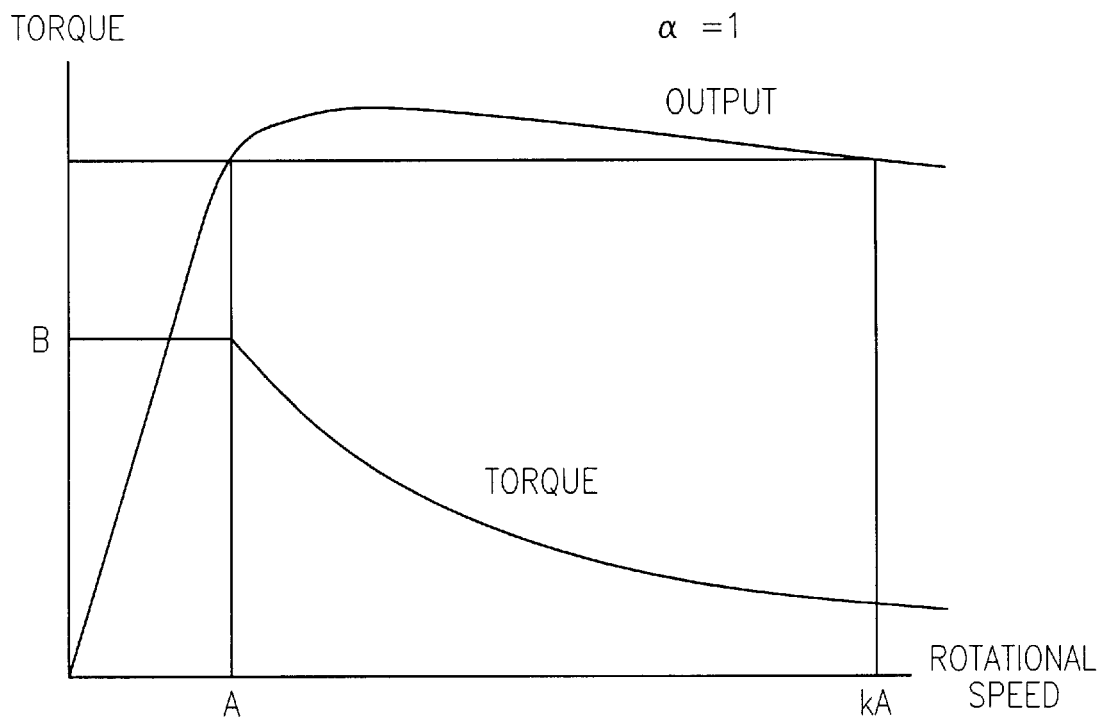
FIG. 7 is a diagram showing operating characteristics of a synchronous motor according to a first embodiment of the present invention.
Figure 8:
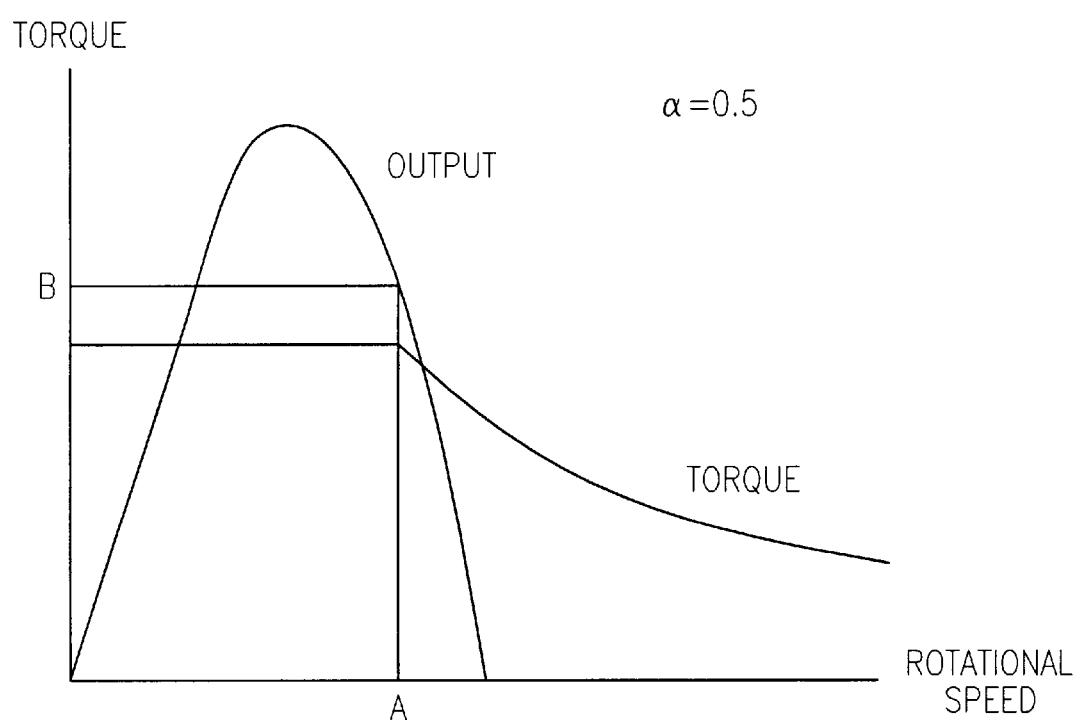
FIG. 8 is a diagram showing operating characteristics of a synchronous motor according to a second embodiment of the present invention.
Figure 9:
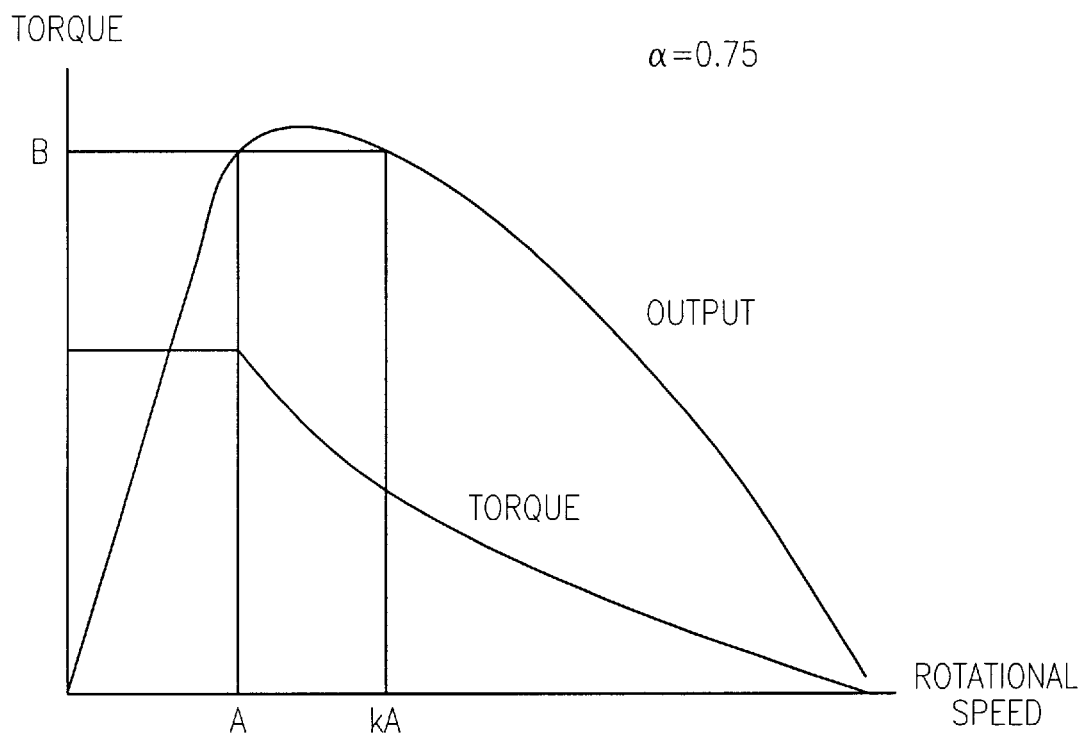
FIG. 9 is a diagram showing operating characteristics of a synchronous motor according to a third embodiment of the present invention.
Figure 10:
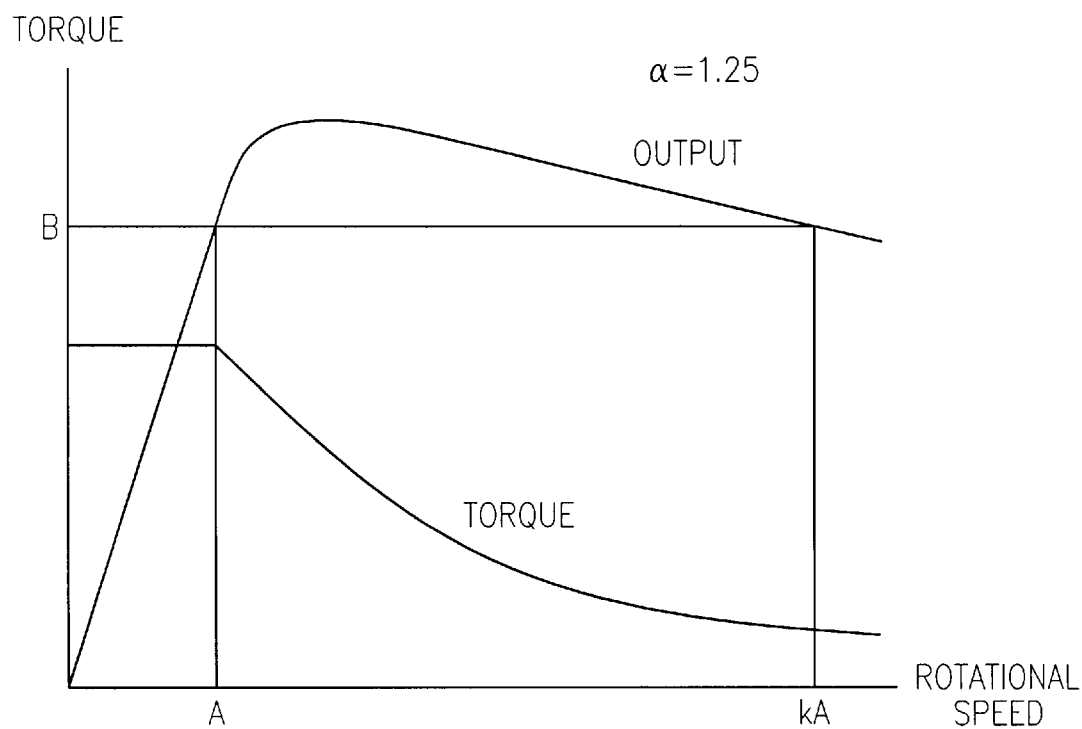
FIG. 10 is a diagram showing operating characteristics of a synchronous motor according to a fourth embodiment of the present invention.

| Embodiment | 1st | 2nd | 3rd | 4th |
|---|---|---|---|---|
| α | 1 | 0.5 | 0.75 | 1.75 |
| Char. | FIG. 7 | FIG. 8 | FIG. 9 | FIG. 10 |
| La (µH) | 38 | 19 | 29 | 48 |

TABLE 1-continued

| Embodiment | 1st | 2nd | 3rd | 4th |
|---|---|---|---|---|
| Pmax (kW) | 4 | 4.4 | 4.3 | 3.5 |
| Vmax (V) | | 24 | | |
| Imax (A) | | 150 | | |
| Ke | | 0.0058 | | |

In FIGS. 7 through 10, A represents the rated rotational speed, B the rated output, and kA the high rotational speed at which the rated output B can be maintained.

It can be understood from FIGS. 7 through 10 that while the motors are operated under field weakening control, the rotational speed can be varied in a largest range when α=1.

Figure 11:
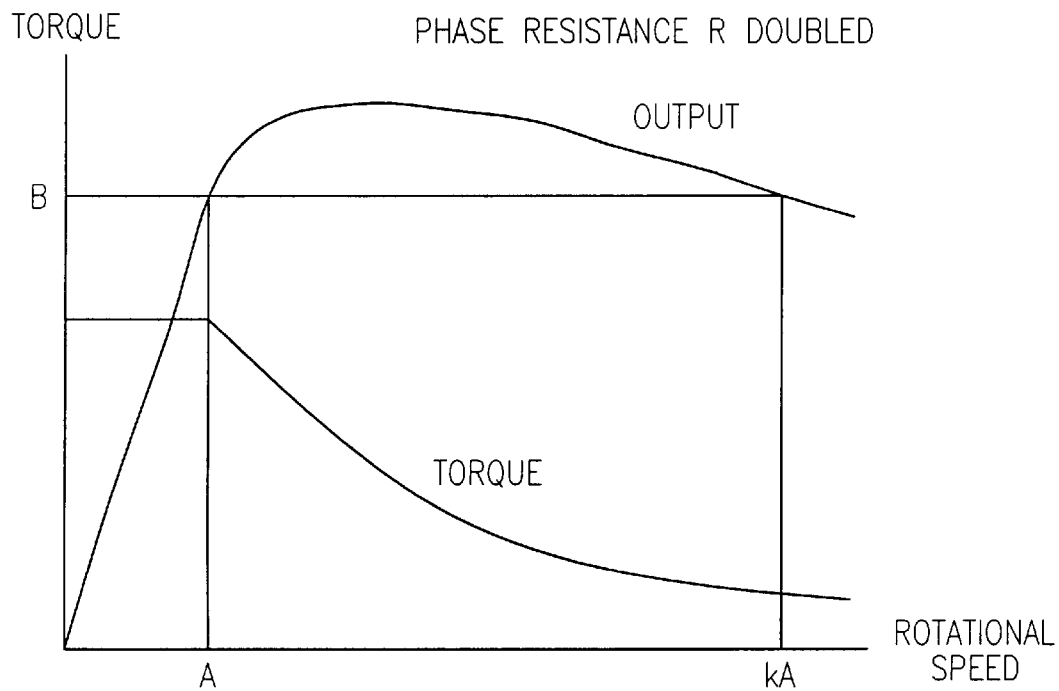
FIG. 11 is a diagram showing operating characteristics of the synchronous motor according to the first embodiment with the phase resistance doubled.
Figure 12:
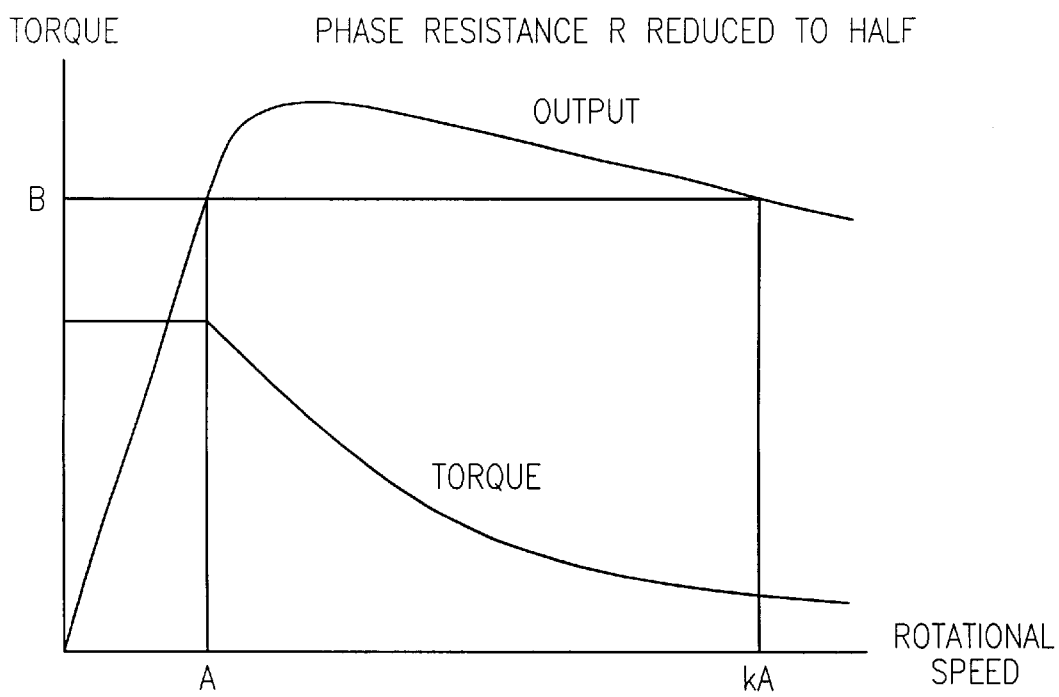
FIG. 12 is a diagram showing operating characteristics of the synchronous motor according to the first embodiment with the phase resistance reduced to half.

FIGS. 11 and 12 shows characteristics with which optimum conditions for operating motors under field weakening control can be determined only based on the induced voltage constant Ke, the rated current Ip, and the inductance La, and are substantially not affected by the phase resistance R.

The diagram of FIG. 11 shows operating characteristics of the synchronous motor according to the first embodiment with the phase resistance doubled, and the diagram of FIG. 12 shows operating characteristics of the synchronous motor according to the first embodiment with the phase resistance reduced to half.

The output curves shown in FIGS. 11 and 12 are slightly higher and lower than those shown in FIGS. 7 and 8, respectively, because of the varied phase resistance R. However, the ranges in which the outputs exceed the rated outputs and the degree to which the outputs are lowered in FIGS. 11 and 12 remain basically unchanged from those shown in FIGS. 7 and 8, respectively.

When the power supply voltage applied to the motors is varied from a value that is 0.5 times the normal value to a value that is 1.5 times the normal value, the ranges in which the outputs exceed the rated outputs and the degree to which the outputs are lowered remain basically unchanged, as when the phase resistance R is varied.

Motors for producing medium and high outputs will be described below with reference to Tables 2 and 3, below.

Table 2 shows characteristics of a motor having a power supply voltage of 48 V and a rated output of 4 kW. The motor is designed such that the phase induced voltage at the time the rated output is produced is 20 V. The phase current Ip at the time the rated output is produced is 133 A (effective value is 94 A).

Induced voltage constants and optimum inductance values with respect to different pole numbers when the rated rotational speeds are of 3000, 4500, and 6000 rpm are given in Table 2. The optimum inductance values mean values optimum for operation under equivalent field weakening control and allowing a wide variable range of rotational speeds in which the motor can be operated for an output higher than a predetermined output.

TABLE 2

| Rated speed | 3000 (rpm) | | 4500 (rpm) | | 6000 (rpm) | |
|---|---|---|---|---|---|---|
| Items | Ke | La | Ke | La | Ke | La |
| 4 poles | 0.032 | 240 µH | 0.021 | 158 µH | 0.016 | 120 µH |
| 10 poles | 0.0127 | 96 µH | 0.0085 | 64 µH | 0.0064 | 48 µH |
| 20 poles | 0.0064 | 48 µH | 0.0043 | 32 µH | 0.0032 | 24 µH |

Table 3 shows characteristics of a motor having a power supply voltage of 200 V and a rated output of 100 kW. The motor is designed such that the phase induced voltage at the time the rated output is produced is 90 V. The phase current Ip at the time the rated output is produced is 740 A (effective value is 523 A).

Induced voltage constants and optimum inductance values with respect to different pole numbers when the rated rotational speeds are of 3000, 4500, and 6000 rpm are given in Table 3.

TABLE 3

| Rated speed | 3000 (rpm) | | 4500 (rpm) | | 6000 (rpm) | |
| --- | --- | --- | --- | --- | --- | --- |
| Items | Ke | La | Ke | La | Ke | La |
| 4 poles | 0.143 | 194 μH | 0.095 | 129 μH | 0.072 | 97 μH |
| 10 poles | 0.057 | 77 μH | 0.038 | 52 μH | 0.029 | 39 μH |
| 20 poles | 0.029 | 39 μH | 0.019 | 26 μH | 0.015 | 20 μH |

Figure 13:
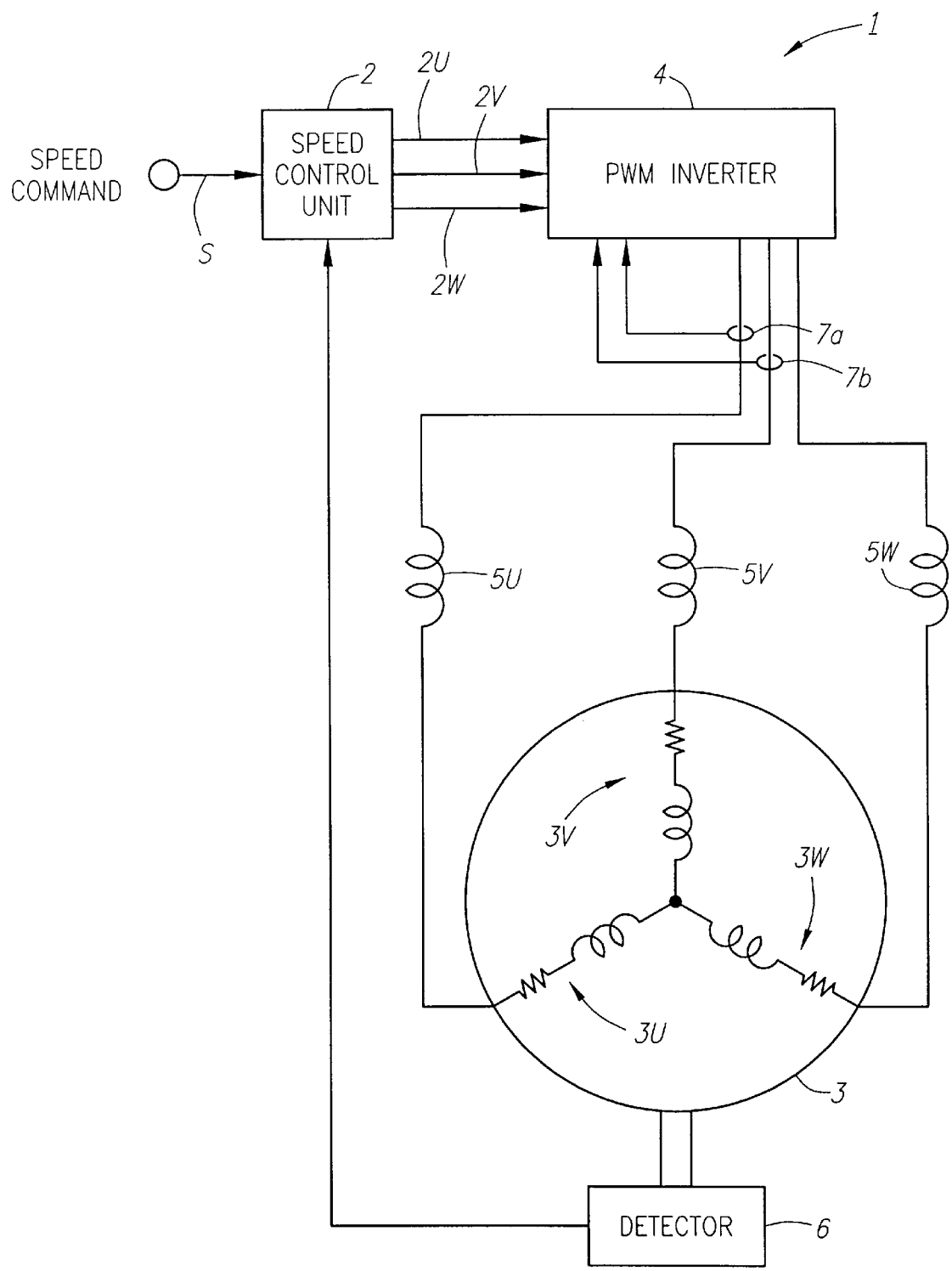
FIG. 13 is a circuit diagram, partly in block form, of a motor system employing a synchronous motor according to the present invention.

FIG. 13 shows a circuit, partly in block form, of a motor system employing a synchronous motor according to the present invention.

The motor system, generally designated by the reference numeral 1, comprises a speed control unit 2 for generating command information 2U, 2V, 2W with respect to current values for respective phases U, V, W, a PWM inverter 4 for supplying electric energy or currents to a synchronous motor 3 with permanent magnets based on the command information 2U, 2V, 2W, correcting inductances 5U, 5V, 5W connected in series to respective windings 3U, 3V, 3W of the motor 3, a detector 6 for detecting the angular displacement or the rotational speed of the motor 3, and current detectors 7a, 7b for detecting currents supplied to the motor 3.

If the motor 3 is to be operated under field weakening control while maintaining a predetermined output up to a speed that is k times the rated rotational speed, and when the inductance La of the motor 3 itself does not satisfy its own condition, the motor 3 can be operated as desired with the correcting inductances 5U, 5V, 5W connected in series to the respective windings 3U, 3V, 3W of the motor 3.

In FIG. 13, the correcting inductances 5U, 5V, 5W are connected in series to the respective windings 3U, 3V, 3W of the motor 3, thereby increasing the inductance Lm of the motor system 1. However, in the case where the inductance Lm of the motor 3 itself is large, the inductance Ls of the motor system is adjusted by connecting the correcting inductances 5U, 5V, 5W parallel to the motor windings 3U, 3V, 3W, respectively.

In the motor with permanent magnets and the motor system according to the present invention, the value α produced by dividing, by the induced voltage constant Ke, the product of the inductance Lm of the motor itself or the inductance Ls of the motor system in the d-q coordinate system is selected to meet a predetermined condition. Therefore, the range of rotational speeds in which the motor can be operated while maintaining a predetermined output under field weakening control can be widened.

If a condition is established to determine a ratio by which the rated rotational speed under normal operating conditions is multiplied into a rotational speed under field weakening control, then conditions for a motor or a motor system that can be used can be determined.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

I claim:

1. A synchronous motor optimized for running under equivalent field weakening control, having
   a rotor comprising permanent magnets;
   an inductance La which is determined by an equation (a), where Ip is a rated current, Ke is an induced voltage constant in a d/q-axis conversion system of the synchronous motor, and α is in a range represented by an inequality (b):

$$La \cdot Ip / Ke = \alpha \quad (a)$$

$$\sqrt{\frac{(k-1)^2}{k^2-1}} \leq \alpha \leq \sqrt{\frac{(k+1)^2}{k^2-1}} \quad (b)$$

where k is a ratio by which a rated rotational speed can be multiplied to a rotational speed for operation without reducing motor output below rated output.

2. A synchronous motor according to claim 1, wherein said value α represented by the equation (a) is 1.

3. A motor system optimized for running under equivalent field weakening control, comprising a synchronous motor having
   a rotor comprising permanent magnets; and
   a driver circuit for driving the synchronous motor,
   the motor system having an inductance Ls which is determined by an equation (c), where Ip is a rated current, Ke is an induced voltage constant in a d/q-axis conversion system of the motor system, and α is in a range represented by an inequality (d):

$$Ls \cdot Ip / Ke = \alpha \quad (c)$$

$$\sqrt{\frac{(k-1)^2}{k^2-1}} \leq \alpha \leq \sqrt{\frac{(k+1)^2}{k^2-1}} \quad (d)$$

where k is a ratio by which a rated rotational speed can be multiplied to a rotational speed for operation without reducing motor output below a rated output.

4. A motor system according to claim 3, wherein said value α represented by the equation (c) is 1.

5. A motor system according to claim 3, further including correcting inductances connected to windings of the synchronous motor for making the inductance Ls satisfy the equation (c).

6. A motor system according to claim 5, wherein the correcting inductances are connected in series to the windings of the synchronous motor.

7. A motor system according to claim 5, wherein the correcting inductances are connected in parallel to the windings of the synchronous motor.

8. A method of configuring a synchronous motor having a rated speed and rated output to operate at a speed higher than the rated speed, comprising the steps of
   selecting the synchronous motor with permanent magnets to have an inductance La, a rated current Ip, and an induced voltage constant Ke in a d/q-axis conversion system of the synchronous motor;
   adjusting the inductance La such that the inductance La, the rated current Ip, and the induced voltage constant Ke remain in proportion of La·Ip=Ke.

9. A method according to claim 8 further comprising operating the synchronous motor at a speed up to √2 times higher than the rated speed without reducing motor output below the rated output.

10. A synchronous motor optimized for running under equivalent field weakening control, comprising:

a stator comprising armature windings;

a rotor comprising permanent magnets;

correcting inductances connected to the armature windings;

a driver circuit for driving the synchronous motor; and the synchronous motor having a rated current Ip and an induced voltage constant Ke in a d/q-axis conversion system of the synchronous motor characterized in that the motor has an inductance La which falls in a range represented by an inequality (c):

$$\frac{Ke}{Ip}\sqrt{\frac{(k-1)^2}{k^2-1}} \le La \le \frac{Ke}{Ip}\sqrt{\frac{(k+1)^2}{k^2-1}} \qquad (c)$$

where k is a ratio by which a rated rotational speed can be multiplied to a rotational speed for operation without reducing motor output below rated output.

11. A synchronous motor optimized for running under field weakening control, comprising:

a stator comprising armature windings;

a rotor comprising permanent magnets;

correcting inductances connected to the armature windings;

a driver circuit for driving the synchronous motor; and the synchronous motor having a rated current Ip and an induced voltage constant Ke in a d/q-axis conversion system of the synchronous motor characterized in that the motor has an inductance La equal to Ke/Ip.

12. For a synchronous motor have windings, a method for configuring the synchronous motor to run under equivalent field weakening control at a rotational speed which is higher than rated speed, comprising the steps of selecting the synchronous motor having a rotor with permanent magnets with a rated current Ip and an induced voltage constant Ke in a d/q-axis conversion system of the synchronous motor;

choosing a rotational speed to run the motor which is a factor k times higher than the rated speed;

adjusting inductance La of the motor windings such that the inductance La falls in a range represented by an inequality in equation (c):

$$\frac{Ke}{Ip}\sqrt{\frac{(k-1)^2}{k^2-1}} \le La \le \frac{Ke}{Ip}\sqrt{\frac{(k+1)^2}{k^2-1}} \qquad (c)$$

13. A method according to claim 10 further comprising operating the synchronous motor at a speed higher than the rated speed without reducing motor output below rated output.

14. A method according to claim 13 further comprising operating the synchronous motor at a speed up to √2 times higher than the rated speed without reducing motor output below the rated output.

15. A method according to claim 10 further comprising adjusting the inductance La to equal Ke/Ip.

16. For a permanent magnet synchronous motor having permanent magnets and windings, a method for optimizing the motor for running under equivalent field weakening control at a rotational speed which is higher than rated speed, comprising the steps of identifying a rated current Ip and an induced voltage constant Ke in a d/q-axis conversion system for the synchronous motor;

adding correcting inductances to the windings of the synchronous motor to set a total inductance Ls of the synchronous motor equal to Ke/Ip.

17. A method according to claim 16 further comprising operating the synchronous motor at a speed up to √2 times higher than the rated speed Ip without reducing motor output below rated output.

18. A method according to claim 16 further comprising connecting the correcting inductances in series to the windings of the synchronous motor.

19. A synchronous motor system adapted to be optimized for running under equivalent field weakening control at a rotational speed which is higher than rated speed, comprising:

a stator comprising armature windings;

a rotor comprising permanent magnets;

a driver circuit for driving the synchronous motor, the synchronous motor having a rated current Ip and an induced voltage constant Ke in a d/q-axis conversion system of the synchronous motor;

correcting inductances connected to the armature windings for modifying total inductance Ls of the motor system equal to Ke/Ip.

* * * * *